April 30, 1968     W. L. GARDNER     3,380,817
METHOD OF MAKING A VITREOUS OFF-AXIS LIGHT FILTER
Filed Sept. 11, 1964
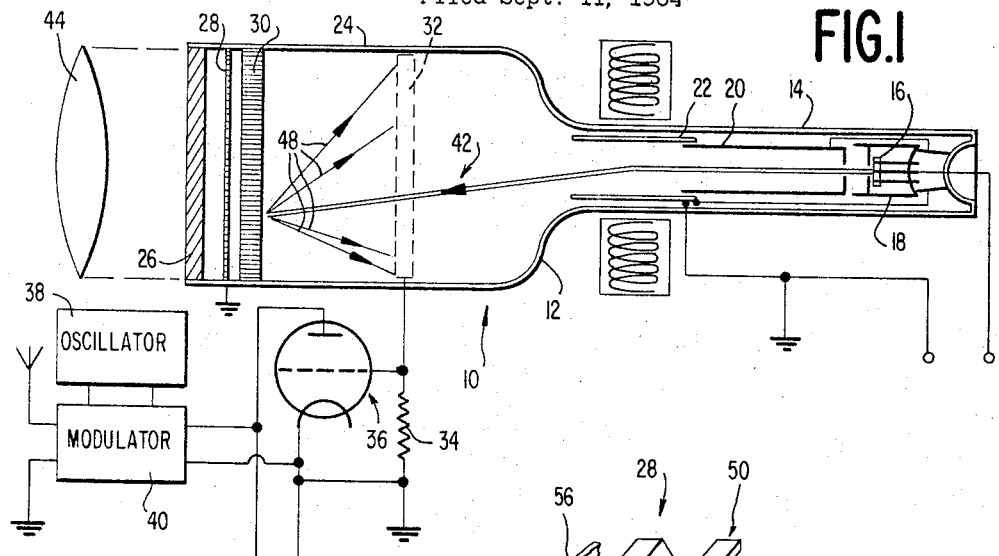
FIG.1
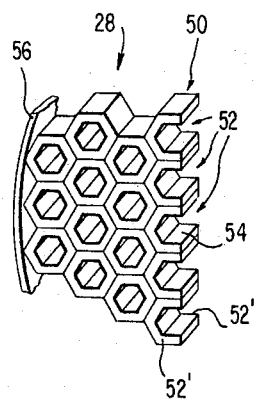
FIG.2
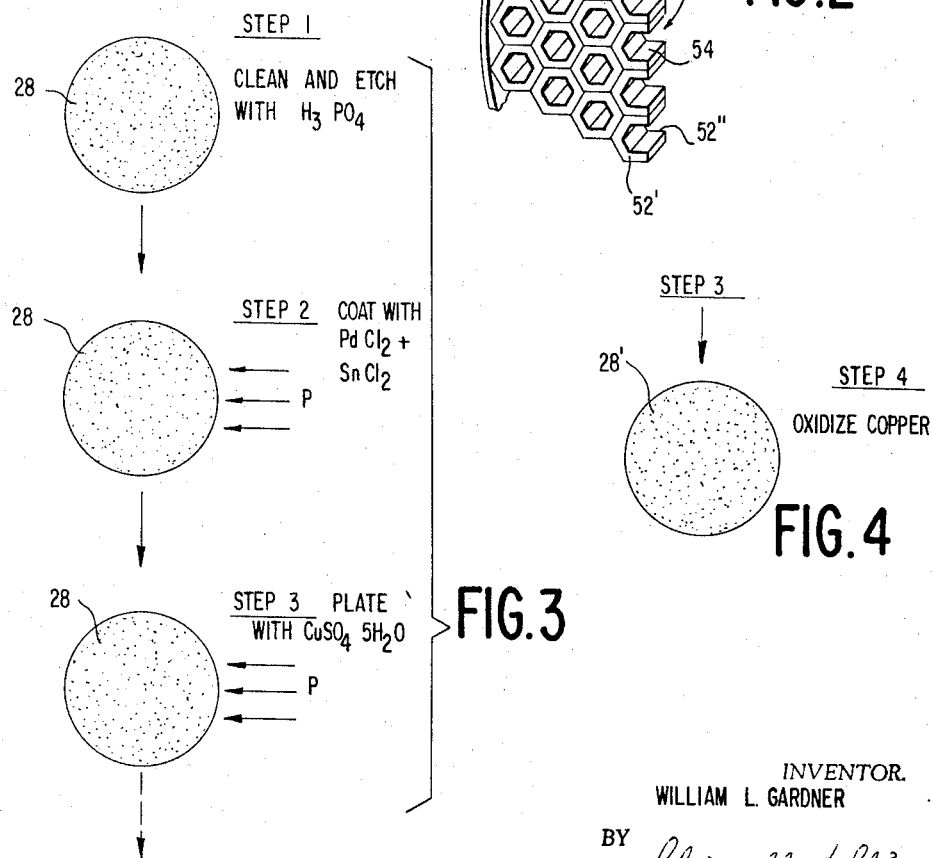
FIG.3
FIG.4
INVENTOR.
WILLIAM L. GARDNER
BY *Stowell & Stowell*
ATTORNEYS United States Patent Office 3,380,817
Patented Apr. 30, 1968

3,380,817
METHOD OF MAKING A VITREOUS OFF-AXIS
LIGHT FILTER
William L. Gardner, Wellesley, Mass., assignor, by mesne
assignments, to The Bendix Corporation, a corporation of Delaware
Filed Sept. 11, 1964, Ser. No. 395,660
3 Claims. (Cl. 65—3)

ABSTRACT OF THE DISCLOSURE

A method is provided for making a vitreous off-axis light filter consisting of a vitreous perforated element wherein the multiplicity of perforations are generally parallel and uniformly spaced throughout the cross-sectional area and the diameter of the openings are in a range from about .01 to about $.10^{-8}$ square inch and the ratio of the cross-sectional areas of the openings to the thickness of the perforate element is from about 2 to 1 to about 1000 to 1 and the total area of the openings being as great as 80% of the total surface area of the element. The perforate element may be provided with an oxidized metallic coating.

---

This invention relates to a method of making a perforate element having particular utility in devices employing plates having extremely small, uniform openings therethrough, the internal surfaces of which are coated with a light impervious material.

It is an object of the present invention to provide methods of making perforate elements wherein the ratio of the cross-sectional areas of the individual openings in the elements to the thickness of the element is as great as about 1000 to 1.

It is a further object of the present invention to provide methods of making a perforate element wherein the openings in the element are generally parallel and uniformly spaced and the cross-sectional areas of the individual openings are from about .01 to about $.10^{-8}$ square inch, and the internal surfaces of the openings are uniformly coated with a light impervious composition in the order of about ½ to 4 microns in thickness.

The invention is provided by a method of making a perforate vitreous sheet member comprising forming a glass wafer with a multiplicity of generally parallel and uniformly spaced openings therethrough with the cross-sectional areas of the individual openings being from about .01 to about $.10^{-8}$ square inch and the ratio of the cross-sectional areas of the individual openings to the thickness of the sheet being from about 2 to 1 to about 1000 to 1 and the total area of said openings being as great as about 80% of the surface area of the perforated portion of the sheet, directing a surface etchant through said openings, coating the walls of the openings with a metallic film by directing a liquid solution of a metal salt and a reducing agent through said openings.

The invention will be more particularly described with reference to the accompanying drawings wherein:

FIG. 1 diagrammatically illustrates an image transmitting apparatus employing a perforate element constructed in accordance with the teachings of the present invention;

FIG. 2 is an enlarged fragmentary perspective view of a portion of the perforate element employed in the image orthicon tube illustrated in FIG. 1;

FIG. 3 is a diagram setting forth the steps which are preferably employed in producing the perforate plates of the invention; and FIG. 4 is a diagrammatic view of a further step in the process illustrated in FIG. 3 which may be employed in constructing perforate plates of the invention.

The perforate elements of the invention encompass glass mesh with a thin metallic coating on both extended surfaces of the element and along the inside walls of the channels. The thin sheets, membranes or wafers of glass are provided with a large number of openings or holes per unit area and a typical geometry within the scope of the present invention would be a wafer 2 inches in diameter, .040 inch thick, with .001" diameter hole on .0012" centers, to thereby provide a disc with about 3 million holes having approximately 50% open area. The structures of the invention are characterized by extreme perpendicularity of the channel walls to the faces of the disc, uniformity in hole diameter from surface-to-surface, and uniformity of hole diameters with respect to each other.

By coating both surfaces or faces of the discs and the channel walls with a metallic light impervious coating, the resulting product has unique applications in gas and liquid flow applications, as electron and ion flow regulating grids in electronic structures and as off-axis light filters whereby instruments, photographic images and the like may be readily viewed under bright light conditions. Preferably, where the perforate element is to be used as an off-axis light filter, the metallic coating is converted to the oxide or sulfide of the metal to provide dark non-light reflecting surfaces.

The invention will be more particularly described with reference to the production of such perforate elements for use as electron and ion flow regulating grids in electronic image orthicon tubes with geometrical and mechanical properties greatly exceeding those obtainable with present-day metal mesh fabrication techniques.

Referring to FIG. 1 of the drawings, 10 generally designates apparatus for transmitting images of objects wherein an optical image of an object to be transmitted is projected upon a photoelectrically active surface and which surface is scanned by a primary beam of electrons. The secondary emission of electrons from the photoelectrically active surfaces are employed to provide picture signals for transmission. The system includes a cathode ray tube 12 having sealed in end 14, a cathode 16, a modulating electrode 18, a cylindrical anode 20, which takes part in focusing electron beams emitted from the cathode, and a cylindrical anode 22. The larger end 24 of the tube 12 is closed with a transparent glass window 26 disposed normal to the axis of the tube. Parallel to and adjacent the window 26 is a perforate metallized wafer 28 constructed in accordance with the teachings of the present invention and the perforate metallized wafer 28 is connected to ground potential as illustrated in the drawings. The larger end 24 of the tube 12 also includes an opaque mosaic electrode 30 and between the mosaic electrode 30 and the anode 26 is disposed an electrode 32 in the form of a metallic ring of a diameter nearly equal to the internal diameter of the tube 24.

The ring electrode 32 is connected to ground potential through a high resistance 34 and the ends of the resistance 34 are connected to the input of an amplifier generally designated 36. The signals amplified in the amplifier 36 are utilized to modulate a carrier wave generated in oscillator 38 with the aid of modulator 40 in known manner.

The mosaic electrode 30 is coated on the window 26 side thereof with a photoelectric material while the opposite face of the mosaic electrode is uncoated and is scanned by the cathode rays generally designated by line 42 in the usual manner. The image to be televised is projected by lens system 44 through the perforated grid 28 onto the photoemissive surface of the mosaic electrode 30. In operation of the device, a light image projected upon the photoemissive surface 30 of the mosaic electrode causes the emission of electrons which are collected by the perforate electrode 28 and, therefore, each element of the mosaic electrode 30 acquires a potential more positive than the equilibrium potential but not as high as the potential of the grounded perforate electrode 28 owing to the photoelectric emission of electrons. The charge acquired by an element of the mosaic, during the time that the scanning beam remains on the element, and the secondary electrons emitted from each of the elements of the mosaic electrode 30 caused by scanning of the surface with the primary beam 42 are directed to the ring electrode 32 and are represented by single lines 48. Successful operation of image orthicon tubes of the type generally illustrated in FIG. 1 depends to a large extent upon the uniformity of the perforate grid electrode 28 which must pass light from the object to the mosaic electrode 30 and must collect the photoemitted electrons from the photoemissive layer of the mosaic electrode. Thus, uniformity of picture transmission depends to a large extent on the uniformity of the light passages through the perforate element and the number of such passages per unit area.

Referring to FIG. 2 of the drawings, there is illustrated a greatly enlarged fragmentary section of a portion of the perforate element 28 illustrated in FIG. 1 of the drawings. The perforate element 28 consists of a vitreous sheet having a plurality of perforations 52 therethrough. The internal surfaces of the perforations or openings are provided with a very thin metallic coating 54 and one or both surfaces of the vitreous sheets 50 is provided with a metallic coating 52' and/or 52'' which surface coatings contact the metallic coatings 54 whereby the entire perforate element may be maintained at a uniform potential.

The vitreous sheet member 50 is preferably constructed using glass fiber techniques.

One method of forming the vitreous sheet member 50 is by feeding a lanthanum silicate glass rod, within a glass tube having a much lower rate of etching, through a heating zone and drawing a composite fiber therefrom. The composite fiber is then cut, stacked and, if the fibers are not of the desired diameter, redrawn, restacked and then fused into a multiple fibered unit which may then be sliced transversely across the fibers into wafers. The wafers are etched in, for example, nitric acid to remove the lanthanum silicate glass rods from each composite fiber, leaving a structure consisting of a glass sheet provided with a multiplicity of parallel uniform openings therethrough. By this method, it is readily possible to provide a 2-inch diameter disc, .04 inch thick containing over 3 million openings which disc would have approximately 50% open area and a hole surface area of more than 3 square feet and a total pore volume of about 2 cubic centimeters.

Suitable glass compositions, etchants and drawing apparatus for constructing the vitreous perforate element are set forth in detail in U.S. patent application Ser. No. 178,526 filed Mar. 6, 1962, for "Fiber Bundles and Methods of Making Same," J. W. Hicks, Jr., now U.S. Patent 3,262,251.

Another method of producing the vitreous porous element is to directly draw a glass tube to a fine capillary fiber which fiber is subsequently cut into short lengths which are stacked like cord wood and fused into a multiple fiber unit which may then be sliced transversely of the fiber direction again employing known glass fiber-forming techniques.

Following the slicing of a wafer wrom the multiple glass fiber bundle, the faces of the wafer are ground and polished such that the faces are parallel to each other and perpendicular to the openings in the sheet. The grinding and polishing operation also sizes the wafer to the desired thickness which may be on the order of about .040 inch. The sliced, ground and polished wafer may be provided with a suitable circumferential support such as illustrated at 56. The circumferential support 56 may comprise a glass or metallic band and where the support 56 is glass, the lateral support may be provided during the final fabrication steps by fusing the drawn fibers in a cylindrical glass tube of suitable internal diameter.

Following the above-outlined procedures, perforate elements are provided having the following characteristics: very high proportion of open area to total surface area; uniformity of openings or perforations with smooth surfaces which are readily reproducible and free of undercutting at the interface of the openings and the faces of the element; and substantial rigidity even when the open area of the element is in the order of 80% of the surface area of the perforate portion of the element. No other procedures will produce perforate plates having all of the above properties or characteristics.

METALLIZING THE SURFACES OF THE PERFORATED VITREOUS ELEMENT

In order to provide metallic surfaces for the channels and the extended surfaces or faces of the porous element special techniques are required and the magnitude of the coating problem can be readily visualized by the fact that a 1-inch diameter disc of .001" holes would have, for example, a hole surface area of more than 1½ square feet to be metallized. A surface of this extent would require, for example, about 1 gallon of copper sulfate plating solution containing 95 grams of $CuSO_4 \cdot 5H_2O$ per liter of solution. This amount of solution must be presented to the internal surfaces of the openings which have only a total pore volume of about $\frac{1}{5000}$ of the volume of the plating solution. Therefore, one of the primary requirements of the metallizing process is to provide a steady flow of fresh solution within the multiplicity of pores of the perforated element.

It has been found that an adequate flow of plating solution may be maintained within the openings by providing a pressure differential across the faces of the perforate element. The pressure differential may be obtained in several ways: for example, reciprocation of the element at relatively rapid rates will provide the necessary flow of plating fluid through the pores; rotation of the perforate element within the plating bath and centrifuging, vacuum or pressure filtration techniques will also provide the necessary flow of the fresh plating solution in the channels of the element. However, where a cyclic linear motion is employed to drive the coating solutions through the channels, it is necessary that the cyclic linear motion have a long enough period to insure removal of exhausted solution from the channels and, further, it is generally necessary to provide support means for the elements, such as the support ring 56 to prevent fracture of the perforated elements during the processing procedure.

Referring particularly to FIG. 3, the perforated element is first cleaned and acid etched to provide a clean, non-smooth surface for good metal adherence to the channel walls and to the exterior surfaces of the element. While hydrofluoric acid etching is normally employed for roughening the surfaces of solid, smooth glass, it has been found that the glass channel walls of the perforate elements of the invention are only in the order of 1 micron in thickness and the glass mesh structure could be destroyed by a hydrofluoric acid etching step. It has been found that the channel surfaces may be adequately cleaned and a non-smooth surface provided thereon by bathing the perforated elements in a dilute aqueous solution of phosphoric acid of about 4% concentration. Preferably, the perforate element is first rinsed in acetone and then water for about 2 to 4 minutes followed by a 2 to 10 minute phosphoric acid cleaning. Following the cleaning with the phosphoric acid, the porous element is again rinsed in water and then the surface of the glass perforate element is coated with a suitable reducing agent. Satisfactory results have been obtained by using a solution of palladium chloride and/or palladium chloride and tin chloride containing about 3 to 4 grams of reagent per gallon. The PdCl$_2$ or the mixture of PdCl$_2$ and SnCl$_2$ is forced through the channels to provide a uniform coating of the reducing agent on the channel walls. Following the coating of the perforate element with the solution of the reducing agent an aqueous solution of the salt of the metal to be plated onto the surfaces of the perforate element is driven against the surfaces and through its channels. A very satisfactory metallic coating has been provided on such perforate discs using a plating solution consisting of 95 grams of CuSO$_4$·5H$_2$O per liter of solution. Such a solution will have a pH of from about 5.7 to 6.3 with a specific gravity of 1.10 at 70° F. It has also been found that uniformity of the coating is enhanced and the time required for the plating may be reduced by adding to the solution a 1% solution of sodium hydroxide. In general, 5 to 15 minutes in such a plating bath will provide a uniform metallized coating on the glass surfaces.

It has been found that coatings of this nature generally have a very uniform thickness and that a metal layer is generally deposited to a maximum thickness of about ⅓ micron and further immersion of the perforate element in the plating solution will generally not increase the thickness of the metal layer. This has been found to be very important as the metal layer must not clog the channels even where the channel openings are .001 inch in diameter or less.

Other satisfactory metal plating solutions such as silver chloride, silver nitrate, palladium chloride and the like may be substituted for the copper sulfate solution specifically described above.

One advantage of employing the copper sulfate solution to plate copper on the surfaces of the perforate elements is illustrated in FIG. 4 wherein the metallized surface of the copper is oxidized to provide a black light-absorbing coating on the surfaces of the perforate element. The oxidizing step may be replaced by a sulfurizing step by forcing an aqueous solution of sodium or potassium sulfide through the channels of the metallized perforate element. Such an oxidized or sulfide coating converts the perforate element into a very effective off-axis light filter. The oxide or sulfide coating reduces head-on light transmission through the perforate element only very slightly. However, the element is substantially opaque to off-axis light thereby providing an improved form of overlay plate for display viewing in high ambient light levels.

EXAMPLE I

A fine fiber was drawn from a glass rod consisting of (percentage by weight) SiO$_2$, 12%; BaO, 47%; B$_2$O$_3$, 18%; ThO$_2$, 10%; LaO$_3$, 10%; iron and aluminum oxides, 3%, surrounded by a glass tube of the following composition (percentage by weight): SiO$_2$, 80.6%; B$_2$O$_3$, 13%; Na$_2$O, 3.8%; K$_2$O, .4%; and Al$_2$O$_3$, 2.2%.

The drawing produced a fiber about .020 inch in diameter and this fiber was cut into suitable lengths and the cut fibers were stacked, one on top of another, and redrawn to form a multiple fiber of approximately 50 fibers across its diameter. The multiple fiber was then cut, stacked and fused into a composite assembly. The assembly was cut into thin plates, the extended surfaces of which were ground and polished flat and parallel to each other.

The cut and polished plates were then etched in one-half normal nitric acid which removed the lanthanum glass rod from the assembly producing a plate having a plurality of smooth, uniform, very small openings there-through.

The etched assembly was washed in acetone and then in water. The openings in the assembly were then flushed with a dilute phosphoric acid solution for 5 minutes followed by an acetone and a water wash.

A solution of palladium chloride (4 grams per gallon of solution) was forced through the pores of the assembly for about 8 minutes and the assembly was then flushed with water.

Following the water flushing, a copper sulfate solution (at about 95 grams per liter of solution) was forced through the pores for 10 minutes. After washing the assembly, it was found that the faces of the element and each of the pores were very uniformly coated with copper.

From the foregoing description of various ramifications of the present invention, it will be seen that the perforate vitreous element and the method of making same fully accomplish the aims and objects hereinabove set forth.

I claim:
1. A method of making a vitreous perforate off-axis light filter comprising forming a glass wafer with a multiplicity of generally parallel and uniformly spaced opening therethrough with the cross-sectional areas of the individual openings being from about .01 to about .10$^{-8}$ square inch and the ratio of the cross-sectional areas of the individual openings to the thickness of the sheet being from about 2 to 1 to about 1000 to 1 and the total area of said openings being as great as 80% of the surface area of the perforate portion of the sheet, directing a surface etchant through said openings, coating the walls of the openings with a reducing agent by directing a stream of a reducing agent through said etched openings, coating the walls of said openings with a metallic layer by directing a stream of a metallic salt through said reducing agent coated openings, and thereafter converting said metal layer to a light-absorbing compound.

2. The invention defined in claim 1 wherein the metal layer is oxidized.

3. The invention defined in claim 1 wherein the metallic layer is converted to the metal sulfide.

References Cited

UNITED STATES PATENTS

| | | | |
|---|---|---|---|
| 3,275,428 | 9/1966 | Siegmund | 65—4 |
| 3,331,670 | 7/1967 | Cole | 65—4 |
| 2,047,369 | 7/1936 | Hickok | 204—24 |
| 2,690,401 | 9/1954 | Gutzeit et al. | 117—54 |
| 2,690,402 | 9/1954 | Crehan | 117—54 |
| 3,134,690 | 5/1964 | Eriksson | 117—98 |
| 3,212,918 | 10/1965 | Tsu et al. | 117—54 |
| 3,222,218 | 12/1965 | Beltzer et al. | 117—98 |
| 3,262,251 | 7/1966 | Hicks | 55—158 |

ROBERT F. BURNETT, *Primary Examiner.*

MORRIS SUSSMAN, *Examiner.*

R. H. CRISS, *Assistant Examiner.*